United States Patent [19]

Bakassian

[11] 3,879,344

[45] Apr. 22, 1975

[54] UNSATURATED ORGANO-TIN MERCAPTIDE STABILIZERS FOR HALO-VINYL POLYMERS

[75] Inventor: Georges Bakassian, St. Foy Les Lyon, Rhone, France

[73] Assignee: Rhone-Poulenc S.A., Paris, France

[22] Filed: Dec. 7, 1973

[21] Appl. No.: 423,375

Related U.S. Application Data

[62] Division of Ser. No. 350,122, April 11, 1973, Pat. No. 3,818,062.

[30] Foreign Application Priority Data

Apr. 12, 1972 France.............................. 72.12771
Mar. 14, 1973 France.............................. 73.09097

[52] U.S. Cl............................. 260/45.75 S; 260/890
[51] Int. Cl....................................... C08f 45/62
[58] Field of Search..................... 260/45.75 K, 481

[56] References Cited
UNITED STATES PATENTS 2,731,484  1/1956  Best.................................. 260/45.75
3,518,223  6/1970  Fath et al........................... 260/45.75

*Primary Examiner*—V. P. Hoke
*Attorney, Agent, or Firm*—Steven, Davis, Miller & Mosher

[57] ABSTRACT

Unsaturated organo-tin mercaptides, useful as stabilisers for halogenated vinyl resins, are obtained by reacting x mols of a mercaptocarboxylic acid HSXCOOH with $y_1$ mols of an alcohol HOYOH or mixture thereof with $y_2$ mols of alcohol HOY'OH and/or $y_3$ mols of alcohol ROH, where X is $C_{1-4}$ alkylene or phenylene, Y is $C_{1-10}$ alkylene or cycloaliphatic of 5 or 6 ring carbons, each with ethylenic and/or acetylenic bonds but not more than 2 of each type of bonds, Y' is $C_{1-10}$ alkylene or cycloalkylene with 5 or 6 ring carbons, R is $C_{1-8}$ alkyl or alkenyl, cycloalkyl or cycloalkenyl with 5 or 6 ring carbons, or phenyl ($C_{1-4}$) alkyl, with $x$, $y_1$, $y_2$ and $y_3$ having specified inter-relationships, to form an intermediate, and reacting the intermediate with a tin component, which is $z_1$ mols of diorgano tin derivative $R_1 R_2 SnO$ or $R_1 R_2 SnCl_2$, or mixture thereof with $z_2$ mols of mono-organo tin derivative which is a stannoic acid monomer or polymer ($R_1SnO_{1.5}$), $R_1SnCl_3$, $R_1Sn(OH)Cl_2$ or $R_1Sn(OH)_2Cl$ where $R_1$ and $R_2$ are $C_{1-10}$ alkyl and $x$, $z_1$ and $z_2$ have specified interrelationships.

7 Claims, No Drawings

UNSATURATED ORGANO-TIN MERCAPTIDE STABILIZERS FOR HALO-VINYL POLYMERS

This is a division of application Ser. No. 350,122, filed Apr. 11, 1973 now U.S. Pat. No. 3,818,062.

This invention relates to organo-tin mercaptides which are particularly suitable for stabilising chlorinated vinyl resins.

It is known from French Patent Nos. 1,055,906, 1,085,807 and 1,138,451 that diorgano-tin mercaptides are good stabilisers for chlorinated vinyl resins, and especially for polyvinyl chloride. It has been recommended to use, in particular, saturated mercaptides such as dibutyl-tin or dioctyl-tin bis-(isooctylmercaptoacetate), these mercaptides currently forming the most effective stabilisers. However, these compounds are not completely satisfactory in some of their uses. Thus they do not prevent the appearance of a yellow colouration in the manufacture of transparent thin walled objects by high temperature extrusion. It is known that such a technique of extrusion will give high productivity only if the chlorinated vinyl resin compositions are heated to temperatures of 180 to 230°C for short periods (e.g. 2 to 5 minutes).

The present invention provides a process for the preparation of an unsaturated organo-tin mercaptide which comprises in step (a) reacting, to form an intermediate $x$ mols of a mercaptocarboxylic acid of the formula:

$$HS - X - COOH$$

with a hydroxylic component, which is $y_1$ mols of a compound of the formula $HO-Y-OH$ or a mixture thereof with at least one of $y_2$ mols of a compound of formula $HO-Y'-OH$ and $y_3$ mols of a compound of formula $ROH$, wherein X represents a straight or branched chain alkylene group of 1 to 4 carbon atoms, or a phenylene group, Y represents a straight or branched chain, aliphatic, divalent hydrocarbon radical with at most 10 carbon atoms, or a cycloaliphatic radical with 5 or 6 ring carbon atoms, the radical Y being divalent with at least one of an ethylenic and acetylenic bond and a maximum of two ethylenic and two acetylenic bonds, Y' represents an alkylene group with 1 to 10 carbon atoms, or a cycloalkylene group with 5 or 6 ring carbon atoms, R represents a straight or branched chain alkyl or alkenyl radical with at most 8 carbon atoms, a cycloalkyl or cycloalkenyl radical with 5 or 6 ring carbon atoms, or a phenylalkyl group, the alkyl substituent of which contains 1 to 4 carbon atoms, and $x$, $y_1$, $y_2$ and $y_3$ are subject to the following inequalities:

$$0.8 \leq \frac{2y_1 + 2y_2 + y_3}{x} \leq 1.2$$

$$0 \leq \frac{y_2}{y_1 + y_2} \leq 0.25$$

$$0 \leq \frac{y_3}{y_3 + 2y_1} \leq 0.50$$

$$0 \leq \frac{2y_2 + y_3}{2y_1 + 2y_2 + y_3} \leq 0.50$$

and in step (b) reacting the intermediate with a tin component, which is:

$z_1$ mols of a diorgano-tin derivative of formula $R_1R_2SnO$ or $R_1R_2SnCl_2$; or a mixture of $z_1$ mols of the diorgano-tin derivative with $z_2$ mols of a monoorgano-tin derivative, which is a stannoic acid monomer or a polymer thereof with recurring units of formula $R_1SnO_{1.5}$, or of formula $R_1SnCl_3$, $R_1Sn(OH)Cl_2$ or $R_1Sn(OH)_2Cl$, wherein each of $R_1$ and $R_2$, which are the same or different, represents a straight or branched chain alkyl group with 1 to 10 carbon atoms, and $x$, $z_1$ and $z_2$ are subject to the following inequalities:

$$0 \leq \frac{3z_2}{2z_1 + 3z_2} \leq 0.25$$

$$0.8 \leq \frac{2z_1 + 3z_2}{x} \leq 1$$

The organo-tin mercaptides produced according to the general process which has just been defined, have a complex structure and can contain in particular the following groups:

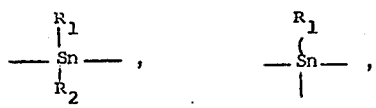

$- S - X - COO - Y - OCO - X - S-$,
$- S - X - COO - Y' - OCO - X - S -$ and
$- S - X - COOR$ when $y_2$, $y_3$ and $z_2$ are O, and $z_1$ and $y_1$ are $0.5x$, then the mercaptide consists essentially of groups of the formula:

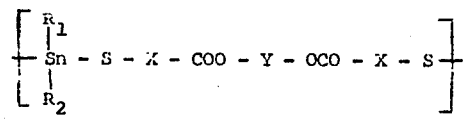

Usually the mercaptide contains 1 to 5 of such groups it being possible in particular for the latter to be bonded in such a way as to form monomeric, dimeric or oligomeric compounds. By way of illustration, the monomeric and dimeric forms have been represented as follows:

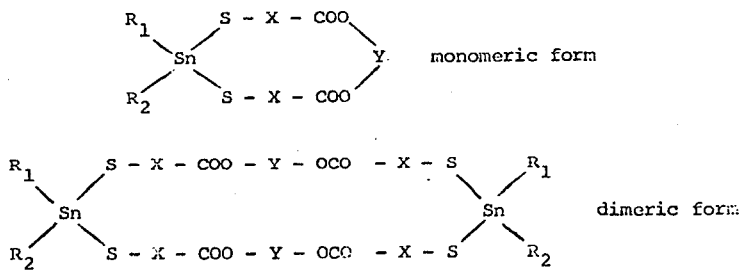

In the process of the invention as unsaturated diol HO—Y—OH and a diorgano-tin compound are reacted together. The use of each of the following reagents is optional, a saturated diol, a saturated or unsaturated monoalcohol and a monoorgano-tin derivative, each of the formula given above. Based on the general process, it is thus possible to define various processes for producing the mercaptides which are of different degrees of simplicity according to whether only one of the two reagents, the unsaturated diol or the diorgano-tin derivative, is partially replaced. The most complex process is that in which all the possible different variables are involved simultaneously. As is apparent from the above inequalities, the replacement of a part of the unsaturated diol is such that the proportion of hydroxyl groups provided by the saturated diol and/or the monoalcohol is at most equal to 50% of the overall sum of the hydroxyl groups present in the hydroxylic component. Furthermore, the tin-mercapto-ester group bonds (involving the sulphur atom) provided by the monoorgano-tin derivative form at most 25% of all the tin-mercapto-ester group bonds formed from the diorgano-tin derivative and the monoorgano-tin derivative.

The compound which results from step (a) of the process, is an unstable compound which changes easily into a resinous substance. It is thus recommended not to attempt to isolate it, and to use it rapidly, as it is, for step (b). When $y_2$, $y_3$ and $z_2$ are O, and $z_1$ and $y_1$ are $0.5n$, then this intermediate compound comprises in particular the $\alpha,\omega$-dimercaptodiester of the formula:

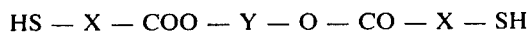

optionally combined with a small proportion of secondary products of the formula:

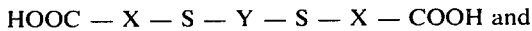

It is recommended that the process according to the invention be carried out in a solvent which is not miscible with water, such as, for example, aliphatic, cycloaliphatic or aromatic hydrocarbons such as hexane, cyclohexane, petroleum ether, methylcyclohexane, benzene or toluene. The water formed during the reaction is advantageously removed e.g. by azeotropic distillation. In order to assist the esterification reaction of step (a), it is possible to add any known esterification catalyst, for example an acid such as p-toluene-sulphonic acid or sulphuric acid. The conversion into a tin mercaptide is advantageously carried out by employing a dialkyltin oxide e.g. di-n-butyl or di-n-octyl-tin oxide, preferably with removal of water e.g. by azeotropic distillation. When a dichlorodialkylstannane is used, it is preferable simultaneously to introduce an agent for neutralising the hydrochloric acid liberated (e.g. ammonia or an amine).

Examples of the unsaturated diols, which can be used and which preferably have one or two ethylene bonds or one acetylene bond, are 2-butene-1,4-diol, 2-pentene-1,5-diol, hexene-1,6-diol, octene-1,8-diol, 1-butene-3,4-diol, 1-pentene-3,4-diol, 2-pentene-1,4-diol, 2-hexene-1,5-diol, 3-heptene-6,7-diol, 4-octene-3,6-diol, 2-butyne-1,4-diol, 2-pentyne-1,4-diol, 3-hexyne-2,5-diol, 1,5-hexadiene-3,4-diol, 4-octyne-3,6-diol, 2,6-octadiene-4,5-diol and 3-methyl-2,6-heptadiene-4,5-diol. Preferably 2-butene-1,4-diol is advantageous.

Examples of the mercaptocarboxylic acids are thioglycollic acid, $\beta$-mercaptopropionic acid, $\gamma$-mercaptobutyric acid, $\delta$-mercaptovaleric acid, thiolactic acid, thiosalicylic acid, $\alpha$- and $\beta$-mercaptobutyric acids and $\beta$- and $\gamma$-mercaptovaleric acids.

Examples of the saturated or unsaturated monoalcohols are isobutanol, n-butanol, isooctanol, octanol, cyclopentanol, cyclohexanol and phenyl ethyl alcohol. Preferably isobutanol, n-butanol, isooctanol, octanol are advantageous.

The unsaturated mercaptides prepared by the process of the invention can be used, after removal of the solvent, for stabilising halogenated vinyl resins and the present invention comprises compositions comprising such a resin and at least one of the unsaturated mercaptides. They are generally introduced into the resin to the extent of 0.2 to 3% by weight relative to the weight of resin. By halogenated vinyl resins there are to be understood, in accordance with terminology which is well known to those skilled in the art, polyvinyl chloride and its copolymers in which the part originating from vinyl chloride predominates. Examples of the compounds, which are suitable for copolymerisation with vinyl chloride, are vinyl esters such as vinyl acetate, vinyl bromide, vinyl fluoride and vinyl butyrate, vinyl ethers such as vinyl ethyl ether, acrylic acid and its derivatives such as ethyl acrylate, ethyl methacrylate, acrylonitrile, methacrylonitrile and acrylamide, allyl compounds such as allyl chloride and allyl acetate, and ethylenic compounds such as ethylene, propylene and butadiene.

The halogenated vinyl resin may be mixed with other polymers e.g. a styrene/butadiene/methyl methacrylate terpolymer for improving the impact resistance of the composition.

The mercaptides according to the invention have a greater retarding effect on yellowing than that of their saturated homologues. These mercaptides are thus very particularly suitable for producing thin films or transparent objects by extrusion or calendering techniques.

The Examples which follow illustrate the invention.

EXAMPLE 1

44 g of 2-butene-1,4-diol are introduced slowly, over the course of 2 hours 30 minutes, into a flask containing 97 g of thioglycollic acid, 600 ml of toluene and 1 g of paratoluenesulphonic acid, the mixture having been brought to the reflux temperature (112°C). The water formed is removed completely by azeotropic distillation. When the esterification is complete, 180 g of di-(n-octyl)-tin oxide are added and the mixture is heated under reflux for 2 hours 15 minutes, with removal of the water formed during the reaction by azeotropic distillation. The toluene is finally removed by distillation and 235 g of organo-tin mercaptide are obtained, the identification of which was carried out in particular by I.R. spectrometry. The product consists essentially of groups of the formula:

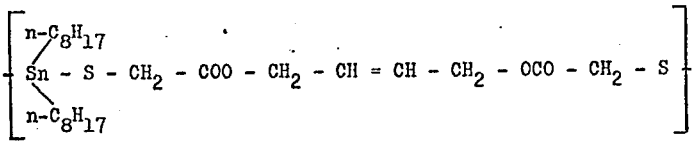

Its average molecular weight is 1,085 (by ebulliometry in benzene).

This compound contains small proportions of groups of the formula:

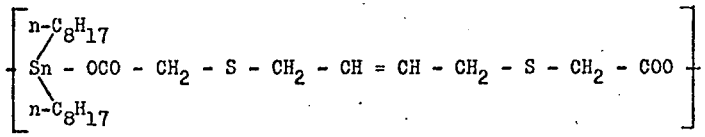

(approximately 10 to 20%; determination by infra-red analysis).

EXAMPLE 2

53 g of β-mercaptopropionic acid and 22 g of 2-butene-1,4-diol are reacted, in benzene, in accordance with the procedure of the preceding Example, and the reaction is continued until the water formed has been completely removed. 62 g of di-(n-butyl)-tin oxide are then added and the reaction is continued as in Example 1. 120 g of organo-tin mercaptide consisting essentially of groups of the formula:

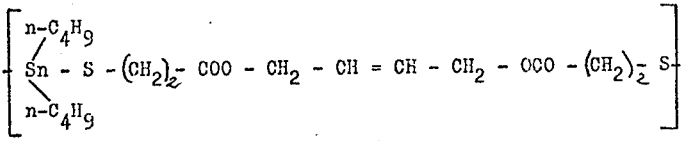

are thus obtained.

This compound contains small proportions of groups of the formula:

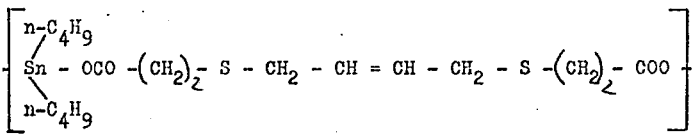

(approximately 10 to 20%; determination by infra-red analysis).

EXAMPLE 3

21.5 g of 2-butyne-1,4-diol and 250 ml of toluene are introduced into a flask and heated to the reflux temperature (110°C), and a mixture containing 48 g of thioglycollic acid and 0.5 g of p-toluenesulphonic acid is run in slowly over the course of 1 hour. The water formed during the reaction is removed by azeotropic distillation, and then 62 g of dibutyl-tin oxide are added and the mixture is heated under reflux for 45 minutes, removing the water formed by azeotropic distillation. After distillation of the toluene, 111 g of organo-tin mercaptide, consisting essentially of groups of the formula:

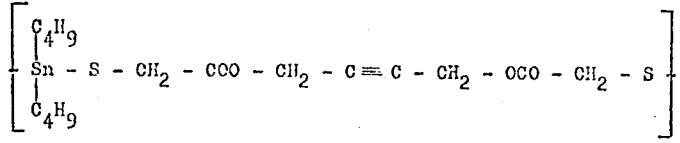

are obtained.

EXAMPLE 4

204 g of thioglycollic acid, 37 g of isobutyl alcohol, 70.5 g of 2-butene-1,4-diol, 1 g of p-toluenesulphonic acid and 1,000 cm³ of petroleum ether are introduced into a flask and heated to the reflux temperature (57°C); the water formed is removed by azeotropic distillation and then 251 g of dibutyl-tin oxide are added and the water formed is again removed by azeotropic distillation. After removing the solvent, 491 g of unsaturated organo-tin mercaptide, consisting essentially of groups of the formula:

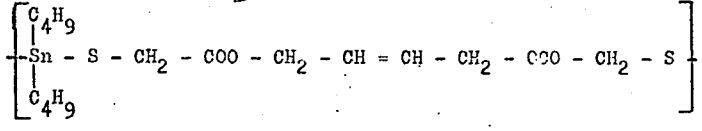

and

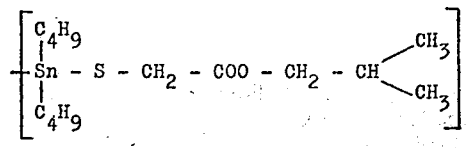

are obtained.

EXAMPLE 5

Various samples based on polyvinyl chloride resin, having the following composition, are prepared:

| | |
|---|---|
| Commercial polyvinyl chloride, sold commercially under the tradename LUCOVYL BB 800 | 100 g |
| Styrene/butadiene/methyl methacrylate terpolymer, used as an additive to increase impact resistance | 10 g |
| 1,3-Butylene glycol ester of oxidised lignite wax, sold commercially under the tradename Wax E | 1 g |
| Stabiliser (diorgano-tin mercaptide) | 1 g |

One of the following stabilisers is used for each mixture:

| | |
|---|---|
| Stabiliser A: | That prepared in Example 1 |
| Stabiliser B: | That prepared in Example 2. |
| Stabiliser C: | Prepared according to Example 1, replacing butenediol by 1,4-butanediol. |

Each mixture is melted in a two-roll mill, revolving at a speed of 15 revolutions/minute and heated to 180°C (temperature maintained to within about 2°). Samples are removed, the first after being worked for 5 minutes on the calenders and the following samples every 3 minutes thereafter, and the colourations are noted. The examination is carried out with the naked eye. The yellowing numbers are also noted in accordance with the Gardner scale, by means of a Lovibond comparison disc. The results are given in the following table:

| Duration of heating at 180°C in minutes | Stabilised PVC resin | | | | | |
|---|---|---|---|---|---|---|
| | Stabiliser A (Example 1) | | Stabilizer B that of Example 2 | | Stabilizer C (saturated homologue of stabiliser A) | |
| | appearance | GARDNER number | appearance | GARDNER number | appearance | GARDNER number |
| 5 | Colourless | 0 | Colourless | 0 | Pale yellow | 0 |
| 8 | Colourless | 0 | Colourless | 0 | Light yellow | 1 |
| 11 | Colourless | 0 | Colourless | 0 | Yellow* | 2 |
| 14 | Colourless | 0 | Colourless | 0 | Yellow* | 2 |
| 17 | Pale yellow | 0.5 | Pale yellow | 0.5 | Yellow* | 3 |
| 20 | Pale yellow | 0.5 | Light yellow | 0.5 | Yellow* | 4 |

*increasing intensity

These experiments show that the unsaturated organo-tin mercaptides have a greater heat stabilising effect than the effect produced by the saturated homologues.

EXAMPLE 6

Two stabilised polyvinyl chloride resin compositions are used as in Example 5 but with stabilisers A-C replaced by 1 g of the stabiliser of Example 3 in composition and
1 g of the stabiliser of Example 4 in other composition.

Each mixture is melted in a two-roll mill, revolving at a speed of 15 revolutions/minute and heated to 180°C. (temperature maintained to within about 2°C). Samples are removed, the first after being worked for 5 minutes on the calenders and the following samples every 3 minutes thereafter, and the colourations are noted (visual examination). The results are given in the following table:

| Duration of heating at 180°C in minutes | Stabilised PVC resin | |
|---|---|---|
| | Unsaturated mercaptide Example 3 | Unsaturated mercaptide Example 4 |
| 5 | Colourless | Colourless |
| 8 | Colourless | Colourless |
| 11 | Colourless | Colourless |
| 14 | Colourless | Colourless |
| 17 | Pale yellow | Pale yellow |
| 20 | Pale yellow | Pale yellow |

I claim:

1. A composition which comprises a halogenated vinyl resin and, as stabiliser therefor, 0.2 to 3% by weight of at least one unsaturated organo-tin mercaptide prepared by the process which comprises in step (a) reacting, to form an intermediate, x mols of a mercaptocarboxylic acid of the formula:

$$HS-X-COOH$$

with a hydroxylic component, which is $y_1$ mols of a compound of the formula $HO-Y-OH$ or a mixture thereof with at least one of $y_2$ mols of a compound of formula $HO-Y'-OH$ and $y_3$ mols of a compound of formula $ROH$, wherein X represents a straight or branched chain alkylene group of 1 to 4 carbon atoms, or a phenylene group, Y represents a straight or branched chain, aliphatic, divalent hydrocarbon radical with at most 10 carbon atoms, or a cycloaliphatic radical with 5 or 6 ring carbon atoms, the radical Y being divalent with at least one of an ethylenic and acetylenic bond and a maximum of two ethylenic and two acetylenic bonds, Y' represents an alkylene group with 1 to 10 carbon atoms, or a cycloalkylene group with 5 or 6 ring carbon atoms, R represents a straight or branched chain alkyl or alkenyl radical with at most 8 carbon atoms, a cycloalkyl or cycloalkenyl radical with 5 or 6 ring carbon atoms, or a phenylalkyl group, the alkyl substituent of which contains 1 to 4 carbon atoms, and $x$, $y_1$, $y_2$ and $y_3$ are subject to the following inequalities:

$$0.8 \leq \frac{2y_1 + 2y_2 + y_3}{x} \leq 1.2$$

$$0 \leq \frac{y_2}{y_1 + y_2} \leq 0.25$$

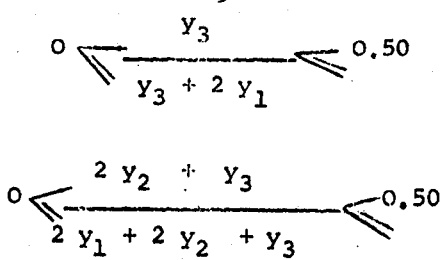

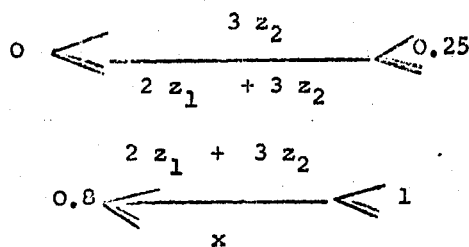

and in step (b) reacting the intermediate with a tin component, which is $z_1$ mols of a diorgano-tin derivative of formula $R_1R_2SnO$ or $R_1R_2SnCl_2$; or a mixture of $z_1$ mols of the diorgano-tin derivative with $z_2$ mols of a monoorgano-tin derivative, which is a stannoic acid monomer or a polymer thereof with recurring units of formula $R_1SnO_{1.5}$ or of formula $R_1SnCl_3$, $R_1Sn(OH)Cl_2$ or $R_1Sn(OH)_2Cl$, wherein each of $R_1$ and $R_2$, which are the same or different, represents a straight or branched chain alkyl group with 1 to 10 carbon atoms, and $x$, $z_1$ and $z_2$ are subject to the following inequalities:

$$0 \leq \frac{3z_2}{2z_1 + 3z_2} \leq 0.25$$

$$0.8 \leq \frac{2z_1 + 3z_2}{x} \leq 1$$

2. A composition according to claim 1 wherein the halogenated vinyl resin is polyvinyl chloride.

3. A composition according to claim 1 which comprises polyvinyl chloride or a mixture thereof with a styrene/butadiene/methyl methacrylate terpolymer and, as stabiliser therefor, about 1% by weight of an unsaturated organo tin mercaptide prepared by a process which comprises in step (a) reacting, a mercaptocarboxylic acid, which is thioglycollic or $\beta$-mercaptopropionic acid, with a hydroxylic component, which is 2-butyne-1,4-diol, 2-butene-1,4-diol or a mixture of 2-butene-1,4-diol and isobutanol, in the presence of p-toluene-sulphonic acid to form an intermediate, and in step (b) reacting the intermediate with a tin component which is di-(n-butyl) tin oxide or di-(n-octyl) tin oxide.

4. A composition according to claim 1 wherein $z_2$ is 0.

5. A composition according to claim 1 wherein $y_2$ is 0.

6. A composition according to claim 1 wherein $y_3$ is 0.

7. A composition according to claim 1 wherein Y contains one ethylenic or acetylenic bond.

* * * * *